Patented May 11, 1926.

1,584,144

UNITED STATES PATENT OFFICE.

LINWOOD T. RICHARDSON, OF MILWAUKEE, WISCONSIN, ASSIGNOR TO THE CUTLER-HAMMER MFG. CO., OF MILWAUKEE, WISCONSIN, A CORPORATION OF WISCONSIN.

FURFURAL-ACETONE RESINS AND METHOD OF PRODUCING THE SAME.

No Drawing.   Application filed August 10, 1925.   Serial No. 49,486.

This invention relates to synthetic resins and methods of producing the same and more particularly to improvements in resins of the furfural-acetone reaction type.

Resins have heretofore been produced from the reaction of furfural and acetone in the presence of an alkali. Such resins or resinous products are, however, unadapted to certain uses industrially and commercially; and one object of this invention is to improve the characteristics of resins of the afore-mentioned type for certain purposes.

Another object is to provide a resin of the furfural-acetone type which is eminently adapted, either with or without the addition of suitable filler material, for molding into desired shapes, and particularly by hot molding operations.

Another object is to provide a filler material or materials particularly adapted for use with my improved resin or binder.

Another object is to provide novel methods for accomplishment of the aforementioned desirable results.

Other objects and advantages of the invention will hereinafter appear.

I have discovered that a resinous product of improved technical qualities can be formed by causing the product of the well known reaction, in alkaline medium, of furfural and acetone to react further under acid conditions. To produce a reaction product of the aforementioned character I may employ 96 to 288 parts of furfural, with about 58 parts of acetone, and 25 to 50 parts of a fifteen per cent caustic soda solution. In one method of procedure, 25 parts of a fifteen per cent sodium hydroxide solution are placed in a suitable container and a mixture of furfural and acetone (96 to 288 parts of furfural and 58 parts of acetone) is slowly added. The reaction is rapid, and much heat is evolved, but the temperature of the reaction mixture can be regulated by the rate of addition of the mixture of furfural and acetone, or by external cooling or otherwise. The reaction is preferably carried on at a temperature of from 140 to 160 degrees F.

The reaction product is alkaline and is preferably rendered non-alkaline by adding dilute phosphoric acid until the mixture is slightly acid. The product is washed with water, and is then dehydrated by heating at 210 to 220 degrees F. The dehydrated product is a mixture of crystals and a thick liquid.

The aforedescribed procedure may be varied by adding the furfural to a mixture of acetone and caustic solution or by adding acetone to a mixture of furfural and caustic solution. As afore indicated the amount of caustic may be varied within wide limits. Also if desired, small pieces of solid caustic may be employed.

The furfural-acetone reaction product is then dissolved or mixed with a suitable acid condensing agent,—commercial naphthalene sulphonic acid being especially adapted for this purpose. If the reaction product is to be used in conjunction with a filler, it is essential that the latter be free from alkaline properties or characteristics, due to the employment of an acid in my condensation treatment. For this reason acid washed filler materials, such as asbestos, wood flour, cotton flock or the like are preferably employed. The condensation is effected while the material is in the mold, under conditions of combined heat and pressure, as hereinafter described.

The following is given as a more specific example of a molding compound prepared in accordance with my invention: 288 parts of furfural, 58 parts of acetone and 50 parts of a fifteen per cent caustic soda solution are brought together according to one of the aforedescribed methods of procedure. The resulting product is treated with phosphoric acid, then washed with water, and then dehydrated by heating at 220 degrees F. A binder for mixing with filler material is made by dissolving, by slight heating, 9 parts of the dehydrated furfural-acetone reaction product with 1 part of naphthalene sulphonic acid. A suitable mix for molding may be prepared from 10 parts of the binder together with 10 parts of acid washed cotton flock.

The material thus prepared is hot molded under suitable pressure and at a temperature of about 350 degrees F. Due to the presence of the acid agent, and under the aforementioned conditions of heat and pressure, the furfural-acetone product is caused to further react. The formed articles are subjected to the condensation or curing treatment while in the mold,—about three minutes being ordinarily sufficient for curing small pieces. Upon removal of the articles from the mold the same are in finished condition and no further treatment of any kind is required. The finished articles are hard and tough and have dense black surfaces.

What I claim and desire to secure by Letters Patent is:

1. The process of producing a resin which comprises causing a mixture of furfural and acetone to react successively under alkaline and acid conditions.

2. The process of producing a resin which comprises acidifying a partially reacted mixture of furfural, acetone and alkali, and continuing the reaction to the desired point under acid conditions.

3. The process of producing a resin which comprises causing a mixture of furfural and acetone to react in the presence of an alkali, treating the product of such reaction to render the same non-alkaline in character, and then subjecting the same to a further reaction in the presence of an acid.

4. The process of producing a resin which comprises causing a mixture of furfural and acetone to react in the presence of an alkali, treating the product of such reaction to render the same slightly acid in character, washing and dehydrating said product, and then effecting reaction thereof under acid conditions.

5. The process of producing a resin adapted for hot molding, which comprises effecting reaction of furfural and acetone in the presence of an alkaline substance, acidifying the product of such reaction, washing and dehydrating said product, and then effecting further reaction thereof in the presence of an acid.

6. The process of producing a resin adapted for hot molding, which comprises effecting reaction of furfural and acetone in the presence of an alkaline substance, acidifying the product of such reaction, washing and dehydrating said product, and then effecting further reaction thereof in the presence of an acid under conditions of heat and pressure.

7. The process which comprises effecting reaction of furfural and acetone in the presence of an alkali, and then subjecting the product of such reaction to treatment with an acid condensing agent.

8. The process of producing an industrial resin, which comprises effecting reaction of about 288 parts of furfural and 58 parts of acetone in the presence of about 50 parts of a fifteen per cent caustic soda solution, adding to the product of such reaction a quantity of dilute acid, washing the product and then dehydrating the same, and then condensing the product in the presence of an acid condensing agent.

9. The process of producing a molded article, which comprises mixing about 288 parts of furfural, 58 parts of acetone and 50 parts of a fifteen per cent caustic soda solution under conditions adapted to control the reaction which ensues, treating the product of such reaction with dilute phosphoric acid to render the same non-alkaline in character, washing and dehydrating said product at about 220 degrees F., incorporating with said product a quantity of naphthalene sulphonic acid, intimately mixing the same with a fibrous filler, and then molding the material at a temperature of about 350 degrees F.

10. The process of producing a molded article which comprises mixing about 288 parts of furfural, 58 parts of acetone and 50 parts of a fifteen per cent caustic soda solution under conditions adapted to control the reaction which ensues, treating the product of such reaction with dilute phosphoric acid to render the same non-alkaline in character, washing and dehydrating said product at about 220 degrees F., incorporating with said product a quantity of naphthalene sulphonic acid, intimately mixing the same with an acid washed fibrous filler, and then subjecting the material to heat and pressure in a mold for a period of about three minutes.

11. A resin which is the product of successive reactions of furfural and acetone under alkaline and acid conditions.

12. A resin which is the product of reaction of furfural and acetone in the presence of an alkali, said product having been subjected to further reaction under acid conditions.

13. A resin adapted for hot molding treatment, comprising the product of reaction of furfural and acetone in the presence of an alkali, said product having incorporated therewith an acid condensing agent.

14. A resin adapted for hot molding treatment, comprising the reaction product of furfural and acetone in the presence of an alkali, said product having been washed and dehydrated, and having incorporated therewith a quantity of naphthalene sulphonic acid.

15. A molded article comprising a resin which is the product of reaction of about 288 parts of furfural and 58 parts of acetone in the presence of about 50 parts of a fifteen per cent solution of caustic soda, said reaction product having been treated to render the same slightly acid and condensed in the presence of an acid condensing agent.

16. A molded article comprising an acid washed filler material and a resin which is the product of reaction of about 288 parts of furfural and 58 parts of acetone in the presence of about 50 parts of a fifteen per cent solution of caustic soda, said reaction product having been treated to render the same slightly acid and condensed in the presence of an acid condensing agent.

17. A hot molded plastic composition comprising an acid washed fibrous filler having incorporated therewith a resinous binder which is the product of reaction of furfural and acetone in the presence of an alkali, said reaction product having been treated to render the same non-alkaline in character and condensed in the presence of naphthalene sulphonic acid.

In witness whereof, I have hereunto subscribed my name.

LINWOOD T. RICHARDSON.